United States Patent
Mears

(10) Patent No.: US 7,051,354 B2
(45) Date of Patent: May 23, 2006

(54) SYSTEM AND METHOD FOR ADVERTISING A CURRENTLY AIRING PROGRAM THROUGH THE USE OF AN ELECTRONIC PROGRAM GUIDE INTERFACE

(75) Inventor: Mark Gilmore Mears, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 292 days.

(21) Appl. No.: 10/350,882

(22) Filed: Jan. 24, 2003

(65) Prior Publication Data

US 2004/0148628 A1    Jul. 29, 2004

(51) Int. Cl.
*G06F 3/00* (2006.01)
*G06F 13/00* (2006.01)
*H04N 5/445* (2006.01)

(52) U.S. Cl. .............................. 725/41; 725/42; 725/43

(58) Field of Classification Search ............ 725/39–44, 725/32, 36; 705/14; G06F 3/13, 13/00; H04N 5/445
See application file for complete search history.

(56) References Cited

U.S. PATENT DOCUMENTS

| 5,940,073 | A  | * | 8/1999 | Klosterman et al. ......... 715/721 |
| 6,526,577 | B1 | * | 2/2003 | Knudson et al. ............... 725/40 |
| 6,588,013 | B1 | * | 7/2003 | Lumley et al. ............... 725/32 |
| 6,756,997 | B1 | * | 6/2004 | Ward et al. ................... 715/716 |
| 6,799,326 | B1 | * | 9/2004 | Boylan et al. ................ 725/35 |
| 2002/0124255 | A1 | * | 9/2002 | Reichardt et al. ............. 725/42 |
| 2002/0138834 | A1 | * | 9/2002 | Gerba et al. .................. 725/42 |

* cited by examiner

*Primary Examiner*—Vivek Srivastava
(74) *Attorney, Agent, or Firm*—Joseph J. Laks; Robert D. Shedd; Reitseng Lin

(57) ABSTRACT

An Electronic Program Guide (EPG) interface includes an information window for displaying a program that is currently airing on a channel; wherein the program to be displayed on the information window is determined by a head end provider. A viewer has no control of which program will be selected for display on the information window.

17 Claims, 5 Drawing Sheets

SYSTEM AND METHOD FOR ADVERTISING A CURRENTLY AIRING PROGRAM THROUGH THE USE OF AN ELECTRONIC PROGRAM GUIDE INTERFACE

TECHNICAL FIELD

This invention relates to the field of electronic program guides in general and, in particular, to apparatus and methods of promoting/advertising through the use of electronic program guides.

BACKGROUND OF INVENTION

Due to the advent of cable television, direct satellite systems, and other television program broadcast systems, television viewers have very large numbers of programs from which to select. Sophisticated systems have been developed to assist a viewer in selecting programs to view or record, among which are the Electronic Program Guide (EPG).

An EPG is displayed on a television display screen as an interface. In essence, an EPG is an interactive, on screen equivalent to TV listings found in local newspapers or other print media. An EPG interface can provide several different kinds of information about each program that is within the time frame covered by the EPG. The time frame typically ranges from the next hour up to seven days in advance. EPG program information is usually displayed in a two dimensional grid comprising a plurality of program cells wherein each cell corresponds to a particular program. Typically, the EPG program schedule grid has time on one axis and channel number on the other axis.

Unlike non-interactive guides that reside on a dedicated channel and merely scroll through the current programming on other channels, viewers can access an EPG interface at any time by entering a proper command on a remote control, keyboard, mouse, or other data entry device. Once a viewer enters the proper command, the content being displayed on the television screen (i.e. the currently tuned channel) is replaced with the EPG interface. Once the EPG interface is displayed, a viewer can interact with the EPG interface by controlling an indicator means, such as a conventional cursor, pointer arrow, highlighted area, or the like. The viewer controls the position of the cursor within the interface by using the directional arrows on a properly configured remote controller or through other conventional means such as a keyboard or mouse. By doing so, a viewer can browse the EPG program schedule grid for desired programming. Additionally, a viewer can interact with and navigate through information associated with a cell of the program schedule grid or other specific area of the interface by highlighting that cell or area with the cursor and entering a proper command. This allows the viewer to perform a variety of features associated with that particular program cell or highlighted area. Examples of features that can be performed are programming a VCR to automatically record a program that is associated with the highlighted cell or view detailed information about that program. Such EPGs are known in the art and are described, for instance, in U.S. Pat. Nos. 5,532,754, 5,353,121, 5,479,268, and 5,479,266.

The content and setup of an EPG interface is controlled by a head end provider. The head end provider transmits electronic program guide data to a receiving apparatus that is either connected to, or has built into it, a display module, such as a television screen or computer monitor. This data transmission can occur through satellite, cable, phone lines, or conventional broadcast towers. The receiving apparatus receives the data, processes it, and displays the resulting EPG interface on the display area of the display module. U.S. Pat. No. 5,515,106, Chaney, describes a data packet structure necessary to implement an EPG system.

Since their initial introduction, EPGs are steadily becoming a standard feature of household television reception systems. As a result of their widespread use and ability to catch the attention of massive amounts of television viewers, those skilled in the art have come to appreciate that EPGs can serve as a valuable means of advertising space. Currently, EPGs are used to advertise/promote an almost endless range of products, including upcoming live events, programs of all kinds, and ordinary commercial products. While methods and apparatus of advertising/promoting programs using EPGs do exist, new and more effective ways of advertising a product/program are always in demand.

Currently, advertisements in EPG interfaces are for the most part simply billboards. These billboards are in a separate area or window of the EPG interface. As used herein, these separate advertising areas are referred to as information windows. While many of these billboard advertisements are static images, some of these advertisements are video clips that are associated with the product or program being promoted. Additionally, some of these existing billboard advertisements are interactive. For example, in an advertisement for an upcoming program, the viewer may be able to highlight the information window that is showing the video clip and set a timer to watch or record the program by entering the proper sequence of commands.

However, merely showing static images or video clips that are associated with a program are often not very interesting to a viewer. As such, viewers develop "banner blindness" because they learn to ignore the advertisement area of the EPG interface. In order to alleviate this phenomenon, there is a need for a more interesting method and apparatus of advertising programs in the EPG environment.

In addition to the above billboard advertising, current EPG interfaces may also have a video window that displays a currently airing program. However, the program displayed in the video window of existing EPGs corresponds to the program cell that is highlighted in the program schedule grid. For example, if a viewer accesses an EPG interface and moves the indicator/cursor within the program schedule grid so as to highlight a cell that corresponds to a program that is currently being aired on channel 2, that program (i.e. channel 2) will be displayed in the video window. In this sense, the viewer can use the EPG interface and program schedule grid as a means to preview currently aired programs. However, because the viewer controls which cell is highlighted, the viewer also controls the identity of the content being displayed in the video window. These types of EPG interfaces cannot serve as effective means of advertising because of the viewer control. Thus, a need still exists for methods that are more effective and apparatus for advertising programs in the EPG environment.

SUMMARY OF THE INVENTION

According to the principles of the invention, an Electronic Program Guide (EPG) interface includes a first portion for displaying programs available for viewing and a second portion for displaying a program currently available on a channel. The program to be displayed on the second portion, however, is selected by a head end provider and not by a viewer. A viewer has no control of which currently available programs will be selected for display on the second portion.

This way, a viewer is more likely to examine the program displayed on the second portion to determine whether the viewer should view the displayed program in a full screen or a larger portion of the screen. As such, the program being displayed acts as an advertisement for itself. This "head end" control allows the head end provider to charge an advertising fee to channel owners to have their programs displayed on the second portion of the EPG interface.

Preferably, the first portion of the EPG interface comprises a program schedule grid comprising program cells. In a selected embodiment, the EPG interface further comprises a video window that displays a program associated with a highlighted cell.

It is also preferable that the program schedule grid occupies a larger area of the EPG interface than the second portion, which includes one or more information windows and a selected program is displayed on one of the information windows. As such, the viewer can still effectively browse the EPG program schedule grid for desired programming. The program being advertised can be any type of entertainment program that is shown on television channels, such as a television show, a movie, a newscast, a sporting event broadcast, or an event broadcast. In order to create further advertising appeal, an information window can be overlayed with a channel logo. Additionally, the EPG interface may include a user interface, which when activated by a viewer causes a display system associated with the EPG interface to automatically tune into the channel associated with the program displayed in an information window. As such, if a viewer becomes interested in the program, the viewer can view the program immediately. The user interface may be an information window itself and the viewer simply highlights the information window with an EPG cursor and entering a proper command.

In another aspect, a system for advertising a program according to the principles of the invention includes a display module having a display area; and an electronic program guide interface being displayed in the display area and comprising an information window displaying a program that is currently available on a channel; wherein the displayed program is selected by a head end provider and not by a viewer.

The display module can be either a television or a computer monitor. It is preferable that the electronic program interface comprises a program schedule grid comprising program cells. In this embodiment, it is preferable for the program schedule grid to occupy a larger area of the EPG interface than the area occupied by the information window. It is also preferable that the electronic program guide interface comprises a position indicator, such as a conventional cursor or pointer arrow, which can be used to highlight the cells of the program schedule grid or the information window. The system can include a mechanism to automatically tune the entire display area of the display module into the channel associated with the selected program in response to a viewer highlighting the information window. Moreover, the system EPG interface can comprise a video window that displays a program corresponding to a highlighted program cell.

It is further preferable that the system includes an audio apparatus to produce audio, such as speakers, headphones, or the like. In this embodiment, it is preferred that the audio associated with the selected program is played through the audio apparatus when a particular information window is highlighted in response to a user command from the viewer.

In yet another aspect, a method of advertising according to the principles of the invention includes the following steps: providing an electronic program guide interface comprising at least one information window; and displaying on the at least one information window a program currently available on a channel, wherein the displayed program is selected by a head end provider and not by a viewer.

This method may further comprise the step of automatically tuning the display area into the channel associated with the program displayed on the information window upon receiving a user command highlighting the information window. Preferably, the method also comprises playing audio associated with the selected program.

DETAILED DESCRIPTION

Figure 1:
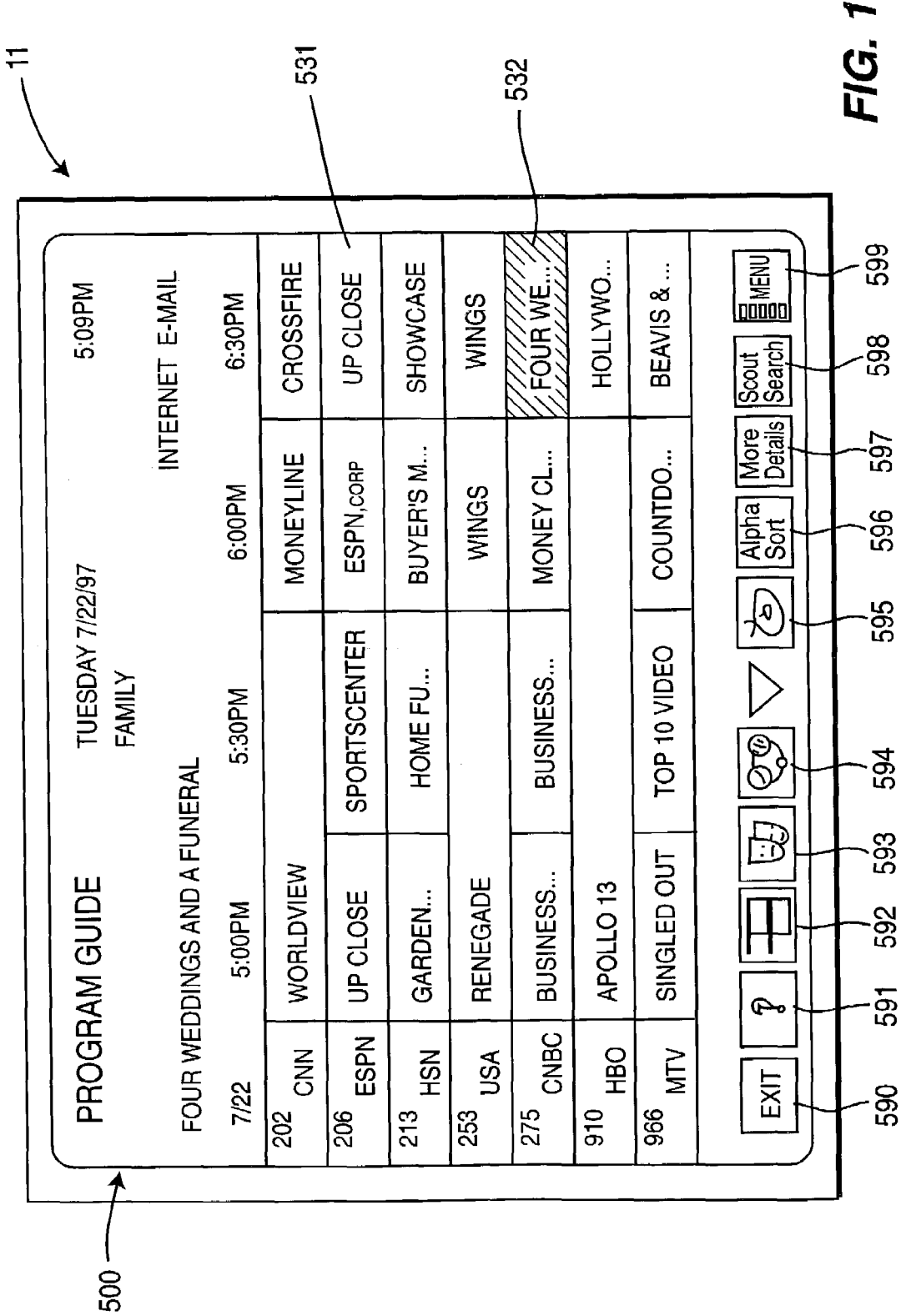
FIG. 1 is a schematic of a standard EPG interface.

Referring to FIG. 1, EPG interface 500 is illustrated. As illustrated Electronic Program Guide (EPG) interface 500 is displayed on display module 11 and occupies the entire display area. Display module 11 can be a television, a computer monitor, or any similar device that is capable of displaying visual images. EPG interface 500 comprises program schedule grid 530. Program schedule grid 530 is a two-dimensional grid with the horizontal axis relating to time and the vertical axis relating to channel. Program schedule grid 530 includes a plurality of program cells 531, which serve as a schedule of upcoming programming. Each program cell 531 relates to a program that is to be transmitted and thus available for viewing on a designated channel at a designated time.

EPG interface 500 further comprises a position indicator, illustrated as cursor 532, which a viewer can use to highlight (illustrated by stripes) and make certain selections relating to EPG interface 500. It is in this way that viewers interact with and navigate EPG interface 500.

Figure 2:
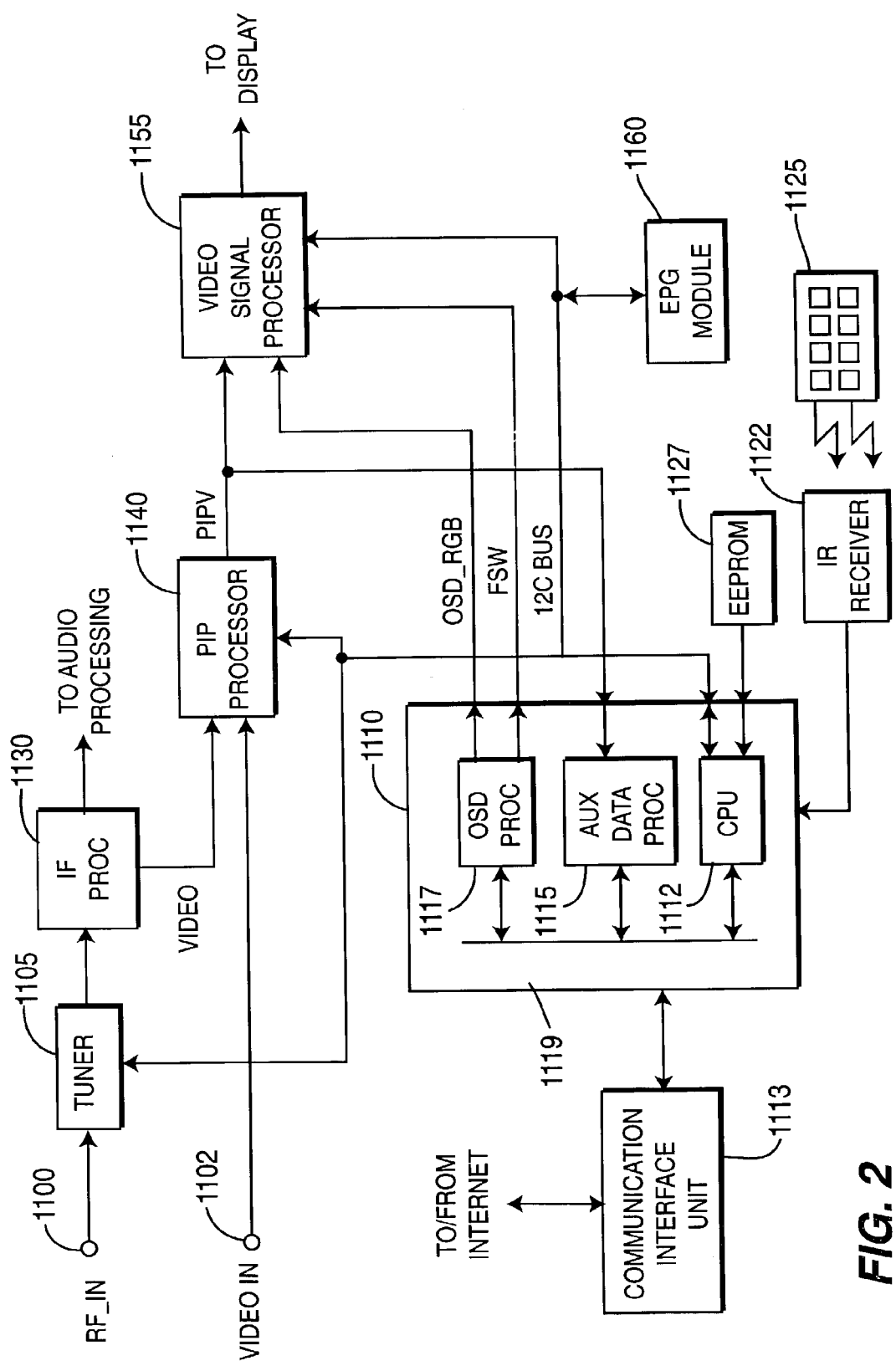
FIG. 2 is a diagrammatic representation of an apparatus capable of producing the EPG interface of FIG. 1.

A viewer controls the position of cursor 532 within EPG interface 500 by entering the appropriate directional commands into controller 1125 (FIG. 2.). Controller 1125, while illustrated as an infrared remote control, can be any type of conventional data input device, such as a keyboard, a mouse, or any type of hand-held remote. In this illustrative embodiment, once the viewer has highlighted the desired program cell 531 or other interactive area of EPG interface 500, the viewer can then access associated interfaces or perform other function associated with that specific area of the interface by entering a proper command through controller 1125. It is in this way that the viewer can obtain more detailed information about the programs listed in program cells 531, access EPG search interfaces, or perform other functions associated with a plurality of interactive buttons 590–599.

FIG. 2 is a schematic of an apparatus capable of processing user commands and displaying the EPG interface 500 of FIG. 1. The apparatus is capable of processing analog NTSC television signals. The apparatus of FIG. 2 has a first in put 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and intermediate frequency (IF) processor 1130 (shown as IF PROC) operates in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 2) for further audio processing. Although FIG. 2 shows input 1102 as a baseband signal, the television receiver could include a second tuner and IF processor similar to units 1105 and 1130 for producing a second baseband video signal from either signal RF_IN or a second RF signal source.

The apparatus shown in FIG. 2 also includes a main microprocessor (uP) 1110 for controlling components of the television receiver such as tuner 1105, picture-in-picture (PIP) processing unit 1140, video signal processor 1155, and EPG module 1160. As used herein, the term "microprocessor" represents various devices including, but not limited to, microprocessors, microcomputers, microcontrollers and controllers. Microprocessor 1110 includes on-screen display (OSD) processor 1117 (shown as OSD PROC), auxiliary data processor 1115 (shown as AUX DATA PROC), and central processing unit (CPU) 1112. Microprocessor 1110 controls the system by sending and receiving both commands and data via serial data bus I$^2$C BUS, which utilizes the well-known I$^2$C serial data bus protocol. More specifically, CPU 1112 executes control programs stored in a memory, such as EEPROM 1127 shown in FIG. 2, in response to commands provided by a user (viewer), e.g., via IR remote control 1125 and IR receiver 1122. For example, activating a "CHANNEL UP" feature on remote control 1125 causes CPU 1112 to send a "change channel" command along with channel data to tuner 1105 via I$^2$C BUS. As a result, tuner 1105 tunes to the channel specified in the command.

CPU 1112 controls functions included within uP 1110 via bus 1119 internal to uP 1110. In particular, CPU 1112 controls auxiliary data processor 1115 and OSD processor 1117. Auxiliary data processor 1115 extracts auxiliary data such as EPG data from video signal PIPV.

EPG data providing program guide data information in a known format is typically received only on a particular television channel and the television receiver must tune to that channel to extract EPG data. To prevent EPG data extraction from interfering with normal use of the television receiver, CPU 1112 initiates EPG data extraction by tuning the particular channel only during a time period when the television receiver is usually not in use (e.g., 2:00 AM). At that time, CPU 1112 configures auxiliary data processor 1115 such that auxiliary data is extracted from horizontal line intervals such as line 16 that are used for EPG data. CPU 1112 controls the transfer of extracted EPG data from auxiliary data processor 1115 via I$^2$C BUS to EPG module 1160. A processor internal to EPG module 1160 module formats and stores the data in memory within the module. In response to the EPG display being activated (e.g., a viewer activating a particular key on remote control 1125), CPU 1112 transfers formatted EPG display data from EPG module 1160 via I$^2$C BUS to OSD processor 1117.

OSD processor 1117 operates in a conventional manner to produce R, G, and B video signals OSD_RGB that, when coupled to a displayed device (not shown), will produce a displayed image representing on-screen display information in accordance with FIG. 1. OSD processor 1117 also produces control signal Fast-Switch (FSW) which is intended to control a fast switch for inserting signals OSD_RGB into the system's video output signal at times when an on-screen display is to be displayed. Therefore, when a user enables the various user interface screens of the present invention to be described later, OSD processor 1117 produces the corresponding signals OSD_RGB representing the on-screen display information previously stored or programmed in the memory within EPG module 1160. For example, when a user enables an EPG, e.g., by activating a particular switch on remote control 1125, CPU 1112 enables OSD processor 1117. In response, OSD processor 1117 produces signals OSD_RGB representing the program guide data information previously extracted and already stored in memory, as discussed above. OSD Processor 1117 also produces signal FSW indicating when the EPG is to be displayed.

Video signal processor (VSP) 1155 performs conventional video signal processing functions, such as luminance and chrominance processing. Output signals produced by VSP 1155 are suitable for coupling to a display device, e.g., a kinescope or LCD device (not shown in FIG. 2), for producing a displayed image. VSP 1155 also includes a fast switch for coupling signals produced by OSD processor 1117 to the output video signal path at times when graphics and/or text is to be included in the displayed image. The fast switch is controlled by control signal FSW, which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

As mentioned above, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, uP 1110 causes OSD processor 1117 to produce the EPG display using information such as program guide data from EPG module 1160. The uP 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes an EPG control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. The uP 1110 detects activation of a selection device, such as clicking a mouse button, and evaluates current cursor location information in conjunction with EPG data being displayed to determine the function desired, e.g., tuning to a particular program. The uP 1110 subsequently activates the control action associated with the selected feature.

The process and displaying of a program guide in accordance with the invention may be implemented using a combination of software and hardware. For example, referring to FIG. 1; display of an EPG may be implemented by software in memory such as EEPROM 1127. Activating an EPG, e.g., by a user pressing an EPG related button on remote control 1125, causes CPU 1112 to execute the EPG software routine. As part of generating an EPG display, CPU 1112 also accesses EPG data and graphics that may be stored in EPG module 1160 via the I²C bus. Under control of the EPG software routine stored in EEPROM 1127, CPU 1112 enables OSD processor 1117, which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples in the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output of VSP 1155.

An exemplary embodiment of the features of the system shown in FIG. 2 that have been described thus far comprises an ST9296 microprocessor produced by SGS-Thomson Microelectronics for providing the features associated with uP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 3:
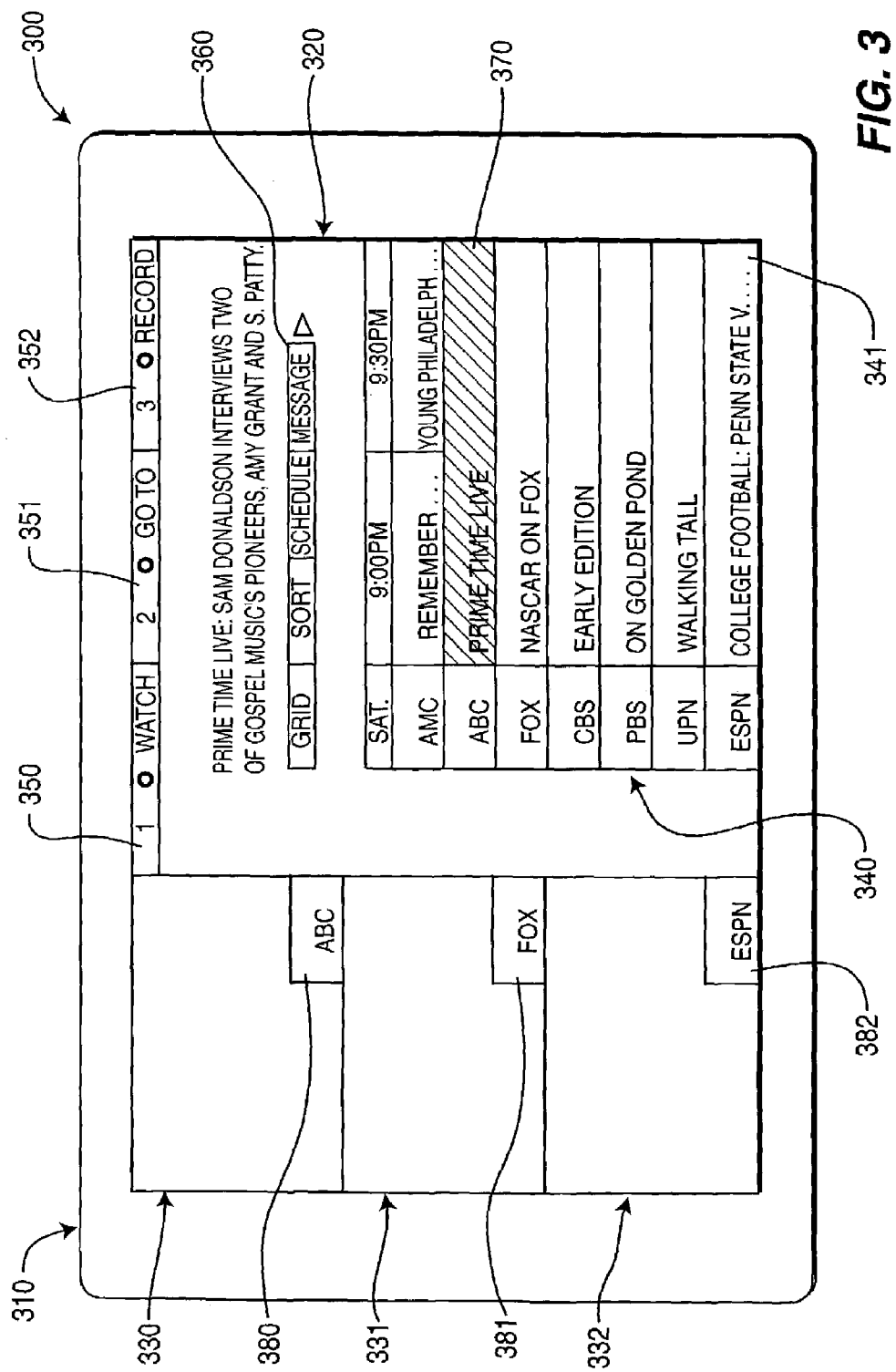
FIG. 3 is a schematic of an EPG interface of the present invention.

FIG. 3 illustrates a schematic representation of the system 300 according to the principles of the invention. System 300 comprises display module 310. Display module 310 can be a television, a computer monitor, or any other device capable of displaying graphical images. In the illustration, EPG interface 320 is displayed in the entire display area of display module 310.

EPG interface 320 comprises video window 330, information windows 331, 332, program schedule grid 340, user command buttons 350, 351, 352, and interface menu bar 360. Program schedule grid 340 is a two-dimensional grid having time on the horizontal axis and channel on the vertical axis. Program schedule grid 340 comprises a plurality of program cells 341. Each program cell 341 corresponds to a program being shown on a particular channel at a specific time. As such, program schedule grid 340 acts as an on-screen listing/guide of all the programs that are to be shown on the listed channels within the EPG time frame. As used herein, a program can be any type of program that is shown on a television or similar display module. Examples of programs include television shows, movies, newscasts, sporting-event broadcasts, and event broadcasts.

Figure 4:
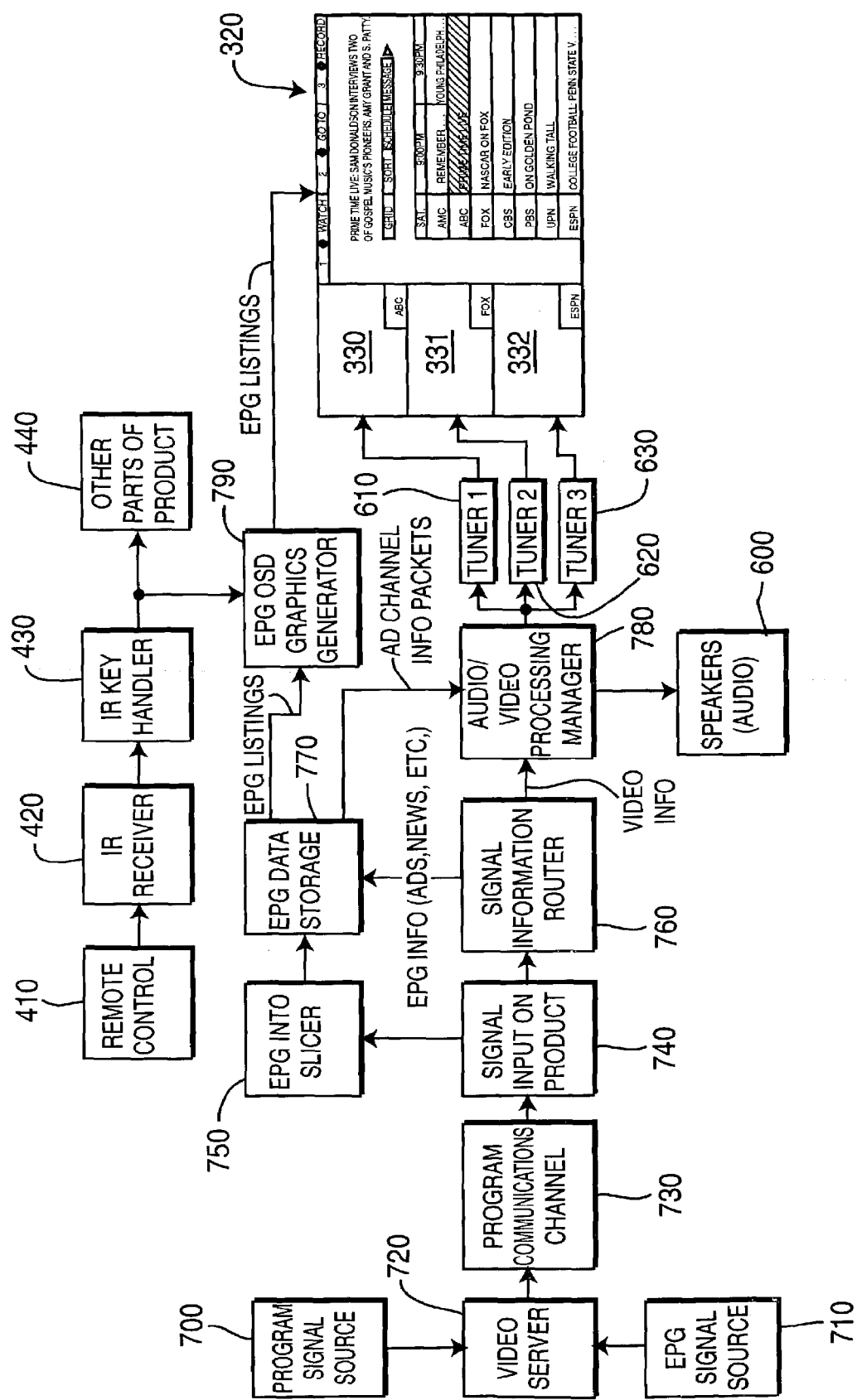
FIG. 4 is a diagrammatic representation of an apparatus capable of producing the EPG interface of FIG. 3.

A viewer accesses EPG interface 320 by inputting a proper command (i.e. a "Display EPG" command) via remote control 410 (FIG. 4). In the illustrated embodiment, remote control 410 is an infrared remote control. However, remote control 410 can be any type of data input device, including a keyboard, mouse, or other type of hand-held controller. Such devices are very well known in the art. Upon entering a "Display EPG" command, the content that is being displayed in the display area of display module 310 is replaced by EPG interface 320.

Once EPG interface 320 is displayed, the viewer can interact with and navigate EPG interface 320 via remote control 410. This interaction is made possible by the use of a position indicator, illustrated as cursor 370. Alternatively, the position indicator can be a pointer arrow such as one that is conventionally used with a mouse in a computer interface environment. By entering directional commands via remote control 410, the viewer can control the movement and position of cursor 370 within EPG interface 320. When the viewer positions cursor 370 over a particular area of EPG interface 320, for example a program cell 341, that area of the interface becomes "highlighted." A "highlighted" area is illustrated in FIG. 3 as a striped area. By moving the cursor and highlighting different areas of PEG interface 320, the viewer can perform functions that are associated with that particular area by entering a "Selection" or other command via remote control 410.

Additionally, the viewer can perform functions associated with program cells 341 by selecting one of the commands associated with input command buttons 350–352. For example, if after highlighting a program cell 341 that corresponds to an upcoming program, the viewer decides that he wishes to automatically record this program, he can enter the proper command or sequence of commands into remote control 410. Methods and apparatus for accomplishing these functions are well known in the art.

As mentioned above, EPG interface 320 comprises video window 330. As a viewer browses program schedule grid 340 with cursor 370 for a desired program, cursor 370 will highlight the program cell 341 that the viewer positions the cursor 370 over. EPG interface 320 is designed so that upon a particular program cell 341 being highlighted, the program associated with the highlighted program cell 341 is displayed on video window 330. For example, in the illustrated embodiment, the viewer has positioned cursor 370 so as to highlight the program cell 341 corresponding to "Prime Time Live," which is showing on ABC from 9:00–9:30 PM. As such, the ABC channel (i.e., Prime Time Live) will be tuned into and displayed within video window 330. Moreover, when a particular program cell 341 is highlighted, the audio associated with that program can be played over speakers 600 (FIG. 4).

Video window 330 also comprises logo overlay 380. Logo overlay 380 is a graphical representation of a channel's logo, which is layered on top of video window 330 so that the viewer can still see the program being displayed in video window 330. The exact logo being displayed as logo overlay 380 is the logo corresponding to the highlighted channel whose content is being displayed in video window 330. In the above example, the "ABC" logo would be overlaid on the display of "Prime Time Live" in video window 330. While logo overlay 380 is illustrated as being in the bottom right corner of video window 330, there are no limitations on its placement, and logo overlay 380 can be positioned anywhere within video window 330.

Because the viewer can determine the program content that is displayed in video window 330 by highlighting a desired program cell 341, the viewer controls the identity of the program content displayed in video window 330. Because of this viewer control, video window 330 is not an effective means of advertising.

Information windows 331, 332 each display a program that is currently available for viewing on one of the channels listed in program schedule grid 340. In the illustration, the program being aired on FOX is displayed in information window 331 while the program being aired on ESPN is displayed in information window 332. More specifically, assuming that the current time is 9:00 PM, in the illustrated embodiment, NASCAR would be displayed in information window 331 while College Football would be displayed in information window 332. In this way, when the viewer accesses the EPG interface 320 to find a desirable program to watch, the viewer will see the NASCAR and College Football programs being displayed in the information windows 331, 332. As such, the programs act as advertisements for themselves by capturing viewer attention. Unlike video window 330, the viewer has no control over which currently available for viewing programs (i.e. channel) will be displayed in information windows 331, 332. The program to be displayed in each of information windows 331, 332 is selected by the head end provider that provides the EPG data signal (i.e. EPG signal source (FIG. 4)). As with video window 330, information windows 331, 332 comprise logo overlays 381, 382 respectively. Logo overlays 380, 381 operate the same as logo overlay 380 but in respect to the programs (i.e., channel) being displayed in the information windows.

The viewer can move cursor 370 within EPG interface 320 so as to highlight either of information windows 331, 332. When the viewer highlights one of the information windows 331, 332, the audio corresponding to the highlighted information window may be played over speakers 600 (FIG. 4), or other suitable means to produce audio.

Once an information window 331 or 332 is highlighted, a viewer can automatically tune into the channel whose program is being displayed therein by entering a proper command, such as a "Select" command, into remote control 410 (FIG. 4). Upon a viewer entering this command, the display area of display module 310 is tuned into the channel associated with the program displayed in an information window. As such, the display of EPG interface 320 will be replaced by the display of the program.

FIG. 4 illustrates a simplified diagrammatic representation of an apparatus capable of producing the EPG interface of FIG. 3 having the functionality discussed above. The elements of FIG. 4, and its corresponding discussion below, focus on those aspects that are necessary to implement the inventive aspects of the EPG interface of FIG. 3. As such, in light of the disclosure related to FIG. 4., one of ordinary skill in the art will appreciate how to modify the hardware and software of FIG. 2 to produce the EPG interface of FIG. 3 having the functional aspects discussed above.

In generating the EPG interface of FIG. 3, program signal source 700 generates and transmits program signals to video server 720. The method and means by which program signal source 700 transmits program signals to video server 720 includes traditional broadcast signals, cable lines, and satellites. Video server 720 also receives an EPG data signal from EPG signal source 710. The EPG data transmitted by EPG signal source 710 includes data necessary to implement the graphical and functional aspects of EPG interface 320. Data transmission methods are common in the art and can be transmitted via any of the methods mentioned in relation to the program signals.

Once video server 720 receives both the program signal and the corresponding EPG data signal, video server 720 transmits this information to signal input 740 via program communications channel 730. Program communications channel can be a coaxial cable, fiber-optic cable, broadcast signal, or satellite. Signal input 740 is located on the EPG-producing apparatus itself, which can be built into a display module 310 or can be a separate box operably coupled to the display module 310.

Signal input 740 can be any type of device capable of receiving and further transmitting program and other data signals. The exact embodiment of signal input 740 depends on the type of program communication channel 730 being used. Signal input 740 can be any type of port or antenna that is mechanically and/or electrically compatible with the specific program communications channel 730 used. Once signal input 740 receives the program signal and EPG data, this information is transmitted to EPG information slicer 750 and signal information router 760. EPG information slicer 750 then separates the EPG data from the program signal and passes the EPG data to EPG data storage 770. EPG data storage 770 can be any type of conventional non-volatile memory device. Signal information router 760 receives the program signal, and passes the video information part to the audio/video processing manager 780. Audio/video processing manager 780 processes the audio and sends it to speakers 600 for listening by the user. Audio/video processing manager 780 uses advertisement channel info (Ad Info) packets received from EPG data storage 770 to determine which programs to tune using tuners 610, 620, and 630. The Ad Info includes advertisement priority setting information and is part of the received EPG data. In this illustrative embodiment, tuner 610 video is tuned and displayed in video window 330. The video signals from tuners 620 and 630 are displayed on information windows 331 and 332, respectively. EPG OSD graphics generator 790 processes the EPG listings and combines them with pre-stored graphics to overlay an EPG interface 320 on top of video window 330, and information windows 331, 332 to complete the EPG. If an advertisement channel info packet indicates a priority to display a program as an advertisement, then no OSD graphics such as static advertisement graphics are generated in the location (e.g., 331, 332) which creates the effect of a "cutout window" to allow the tuned video to be displayed through the OSD. If an advertisement channel info packet does not indicate a priority to display a program as an advertisement (i.e., a static "billboard" advertisement has priority to be displayed), then the static advertisement graphic is generated in the location (e.g., 331, 332) purposely obscuring any tuner video beneath it. The priority settings of whether to show a static advertisement or a program as an advertisement is contained in the Ad Info within the EPG Listings which are stored in EPG Data Storage 770. The Ad Info contains a list of advertisements (static billboards or programs) and their rules for display (static billboard or program advertisements, time of day and duration to show an advertisement, sequence of when to show which ads in which order, whether or not to show a particular billboard or program when highlighting a particular cell or window). The Ad Info is created and inserted into the EPG data signal at the head end and stored locally in each receiving unit's EPG Data Storage. The Ad Info priority settings are determined by the EPG technology company as influenced by their financial contracts with advertisers and broadcasters.

Figure 5:
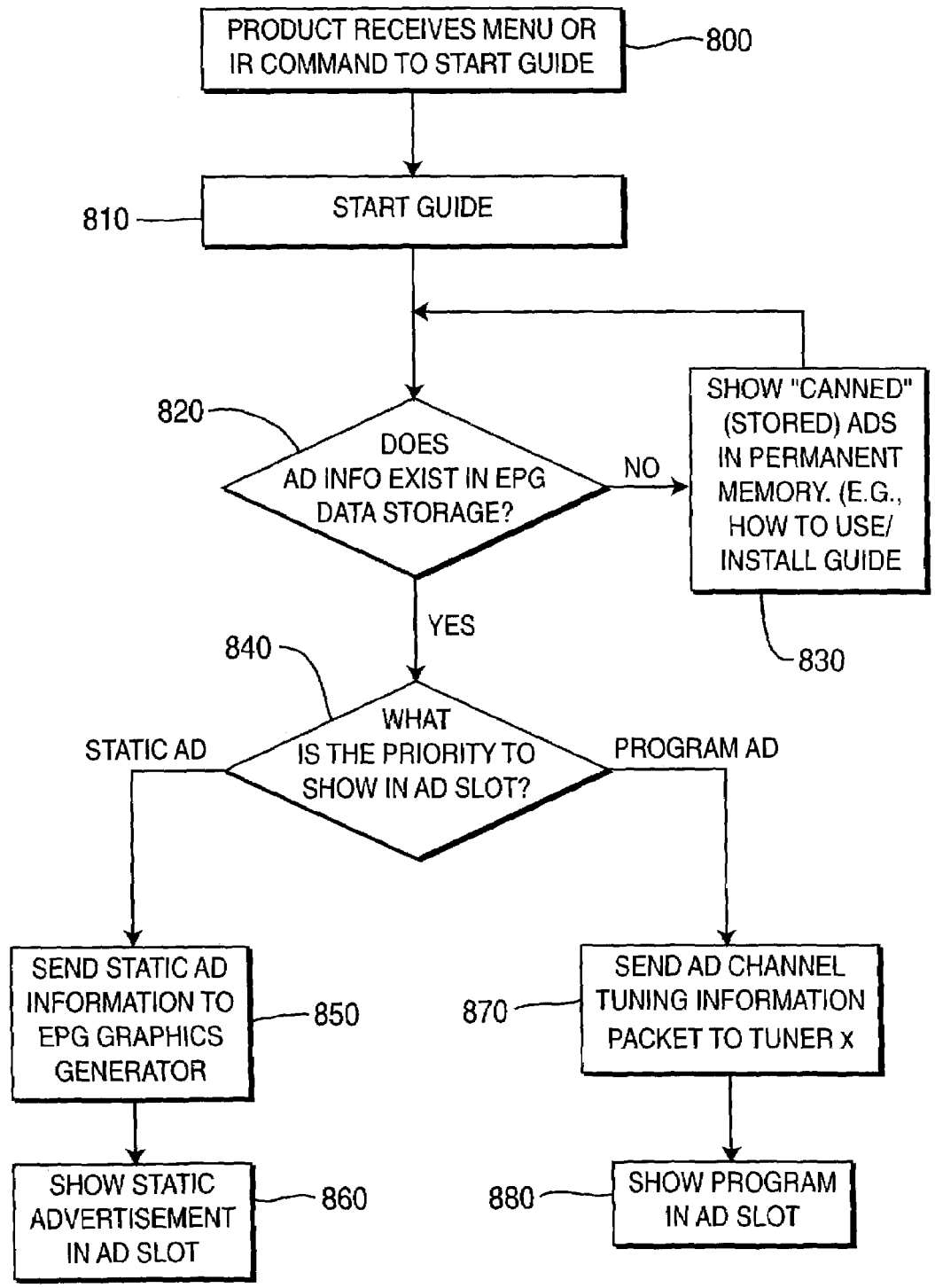
FIG. 5 is a high level flowchart of one method how the system of the present invention works.

FIG. 5 is a high level flowchart of an exemplary method of operating a system according to the principles of the invention. FIG. 5 is explained in reference to the apparatus of FIG. 4 and the EPG interface of FIG. 3. Initially, a viewer enters an input command on an infrared remote control 410 for the apparatus to generate the EPG interface 320. The apparatus receives this infrared command, completing step 800. The EPG interface of FIG. 3 is then generated, completing step 810. Once the EPG interface is generated, a properly programmed processor of the apparatus searches the EPG data storage 770 to see if advertising information exists, completing step 820. If no advertising information exists, "canned ads" are retrieved from a permanent memory and displayed in the information windows 331, 332, completing step 830. The processor will continuously search the EPG data storage 770 for new advertising information. If advertising information does exist in the EPG data storage 770, this data will be evaluated by the processor to determine priority of the ads, completing step 840. Priority of the ads is controlled by the head end (i.e., EPG signal source 710) and corresponding priority data is included in the data that is transmitted therefrom.

Once priority is determined, the processor evaluates the advertising information to determine whether the information relates to a static advertisement or a currently airing program ad. If the advertising information relates to a static ad, the data is transmitted directly to EPG graphic generator 790, completing step 850. This data will then be processed by EPG graphic generator 790, and the static advertisement will be displayed in the appropriate information window 331 or 332, completing step 860. If the advertising information relates to a currently airing program, the ad-channel tuning information is sent to the proper tuner 620 or 630, completing step 870. Depending on which tuner 620 or 630 the data is sent to, information window 331 or 332 will be tuned to the ad-channel and the program will be displayed therein, completing step 880.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An electronic program guide interface on a display in a display system, comprising:
    a first portion for displaying information regarding a plurality of programs currently available for viewing;
    a second portion for displaying video content of a first one of the programs currently available for viewing on a channel wherein the video content displayed on the second portion is selected by a head end provider and not by a viewer and is provided without any input by the viewer to select the first program; and
    wherein audio content associated with the video content displayed in the second portion is played in response to the viewer highlighting the second portion with a cursor, and the channel associated with the video content displayed in the second portion automatically replaces the electronic program guide interface on the display in response to an input by the viewer while the second portion is highlighted.

2. The electronic program guide interface of claim 1 further comprising a third portion for displaying video content of a second one of the programs currently available for viewing on a second channel, and wherein the video content displayed on the third portion is selected by the head end provider and not by the viewer and is provided without any input by the viewer to select the second program.

3. The electronic program guide interface of claim 2 wherein a first tuner is used to provide the video content displayed on the second portion and a second tuner is used to provide the video content displayed on the third portion.

4. The electronic program guide interface of claim 1 wherein the first portion comprises a program schedule grid comprising program cells.

5. The electronic program guide interface of claim 4 wherein the program schedule grid occupies a larger area of the electronic program guide interface than the second portion.

6. The electronic program guide interface of claim 4 further comprising a video window for displaying video content of a program corresponding to a program cell selected by the viewer.

7. The electronic program guide interface of claim 1 wherein each of the programs is selected from a group consisting of a television show, a movie, a newscast, a sporting event broadcast, or an event broadcast.

8. The electronic program guide interface of claim 2 wherein at least one of the second portion and the third portion is overlaid with a channel logo.

9. A method of advertising comprising:
    providing an electronic program guide interface comprising an information window;
    displaying in the information window video content of a program that is currently available on a channel wherein the video content displayed in the information window is selected by a head end provider and not by a viewer and is provided without any input by the viewer to select the program;
    playing audio content associated with the video content displayed in the information window in response to the viewer highlighting the information window with a cursor; and
    automatically replacing the electronic program guide interface with the channel associated with the video content displayed in the information window in response to an input by the viewer while the information window is highlighted.

10. An apparatus for providing an electronic program guide interface comprising:
    a memory operative to store data that enables the electronic program guide interface;
    a first tuner operative to tune first video signals to enable display of video content of a first program currently available for viewing in a first information window of the electronic program guide interface wherein the video content displayed in the first information window is selected by a head end provider and not by a viewer and is provided without any input by the viewer to select the first program; and
    wherein audio content associated with the video content displayed in the first information window is played in response to the viewer highlighting the first information window with a cursor, and a channel associated with the video content displayed in the first information window automatically replaces the electronic program guide interface in response to an input by the viewer while the information window is highlighted.

11. The apparatus of claim 10 further comprising:
    a second tuner operative to tune second video signals to enable display of video content of a second program currently available for viewing in a second information window of the electronic program guide interface; and
    wherein the video content displayed in the second information window is selected by the head end provider and not by the viewer and is provided without any input by the viewer to select the second program.

12. The apparatus of claim 11 wherein audio content associated with the video content displayed in the second information window is played in response to the viewer highlighting the second information window with the cursor.

13. The apparatus of claim 11 wherein at least one of the first and second information windows includes a channel logo.

14. The apparatus of claim 11 wherein:

the electronic program guide interface further comprises a program schedule grid including a plurality of program cells; and a moveable position indicator can be used by the viewer to highlight the program cells.

15. The apparatus of claim 14 wherein the program schedule grid occupies a larger area of the electronic program guide interface than either one of the first and second information windows.

16. The apparatus of claim 14 further comprising:

a third tuner operative to tune third video signals to enable display of video content in a video window of the electronic program guide interface; and wherein the video content displayed in the video window represents a third program that corresponds to a highlighted one of the program cells.

17. The apparatus of claim 16 wherein the program schedule grid, the video window, and the first and second information windows are displayed simultaneously.

* * * * *